RELATIONSHIP BETWEEN VISCOSITY AND THE NUMBER AVERAGE MOLECULAR WEIGHT OF POLYTETRAMETHYLENE GLYCOL

RELATIONSHIP BETWEEN GPC COUNTS AND THE NUMBER AVERAGE MOLECULAR WEIGHT OF POLYTETRAMETHYLENE GLYCOL

MOLECULAR WEIGHT DISTRIBUTION CURVE OF EXAMPLE 4, COMPARATIVE EXAMPLES 4, AND 5

United States Patent Office 3,798,200
Patented Mar. 19, 1974

3,798,200
POLYETHER URETHANE ELASTOMER HAVING AN IMPROVED CUT GROWTH AND FLEX CRACK RESISTANCE AND THE PROCESS FOR PREPARATION THEREOF
Yoshio Kaneko, Tsutomu Matsunaga, Yoji Watabe, and Shigeyuki Toki, Tokyo, Japan, assignors to Bridgestone Tire Co. Ltd., Tokyo, Japan
Filed Dec. 13, 1972, Ser. No. 314,848
Int. Cl. C08g 22/14
U.S. Cl. 260—77.5 AM          13 Claims

ABSTRACT OF THE DISCLOSURE

Polyether urethane elastomer having improved cut growth and flex crack resistance prepared by using polyfunctional isocyanate, curing agent and polyether having active hydrogen terminal groups, wherein the weight average molecular weight of said polyether is within the range of 4,000 to 20,000 and the molecular weight distribution curve of said polyether has at least two peaks, at least one of which is located in the higher molecular weight region and at least another one of which is located in the lower molecular weight region than the rheological critical molecular weight of said polyether.

BACKROUND OF THE INVENTION

Field of the invention

This invention relates to a polyether urethane elastomer having an improved cut growth and flex crack resistance and the process for preparation thereof.

Description of the prior art

It is well known that a urethane elastomer is characteristic of its fluidity before crosslinking and it is possible to cast said elastomer to the desired articles under atmospheric pressure. Therefore, a urethane elastomer is widely used for preparing a roller, machine parts, a solid tire and the like. However, since a polyether urethane elastomer does not have a good cut growth and flex crack resistance, its application is somewhat limited only to products serving under low dynamic deformation.

Many attempts, for example, varying of the kind or the amount the curing agents or increasing of the molecular weight of polyether used for a raw material, have been made to improve cut growth and flex crack resistance of polyether urethane elastomers, but satisfactory effects have never been obtained. For example, the cut growth and flex crack resistance of a polyether urethane elastomer can be improved, to some extent, by increasing the number average molecular weight of the polyether used for a raw material, but said polyether urethane elastomer cannot be applied to practical uses since the modulus and the tensile strength at break are extremely low and the permanent set is large.

SUMMARY OF THE INVENTION

According to one aspect of the present invention, there is provided polyether urethane elastomer having improved cut growth and flex crack resistance prepared by using polyfunctional isocyanate, curing agent and polyether having active hydrogen terminal groups, wherein the weight average molecular weight of said polyether is within the range of 4,500 to 20,000 and the molecular weight distribution curve of said polyether has at least two peaks, at least one of which is located in the higher molecular weight region and at least another one of which is located in the lower molecular weight region than the critical molecular weight of said polyether.

According to another aspect of the present invention, there is provided a process for preparing the polyether urethane elastomer having improved cut growth and flex crack resistance.

An object of this invention is to provide a polyether urethane elastomer having an extremely improved cut growth and flex crack resistance.

Another object of this invention is to provide a polyether urethane elastomer having further a good enough tensile strength at break as engineering material and good casting processability before crosslinking.

DESCRIPTION OF THE PREFERRED EMBODIMENTS

The term "peak" used herein represents not only an apparent maximum peak, but also a shoulder in the molecular weight distribution.

The term, "DHDM type" polyether, denotes a polyether having double or multi humped distribution of molecular weight.

The critical molecular weight is a specific value characteristic of the kind of polyether and the value can be determined by the relationship between viscosity and number average molecular weight of the polyether.

Figure 1:
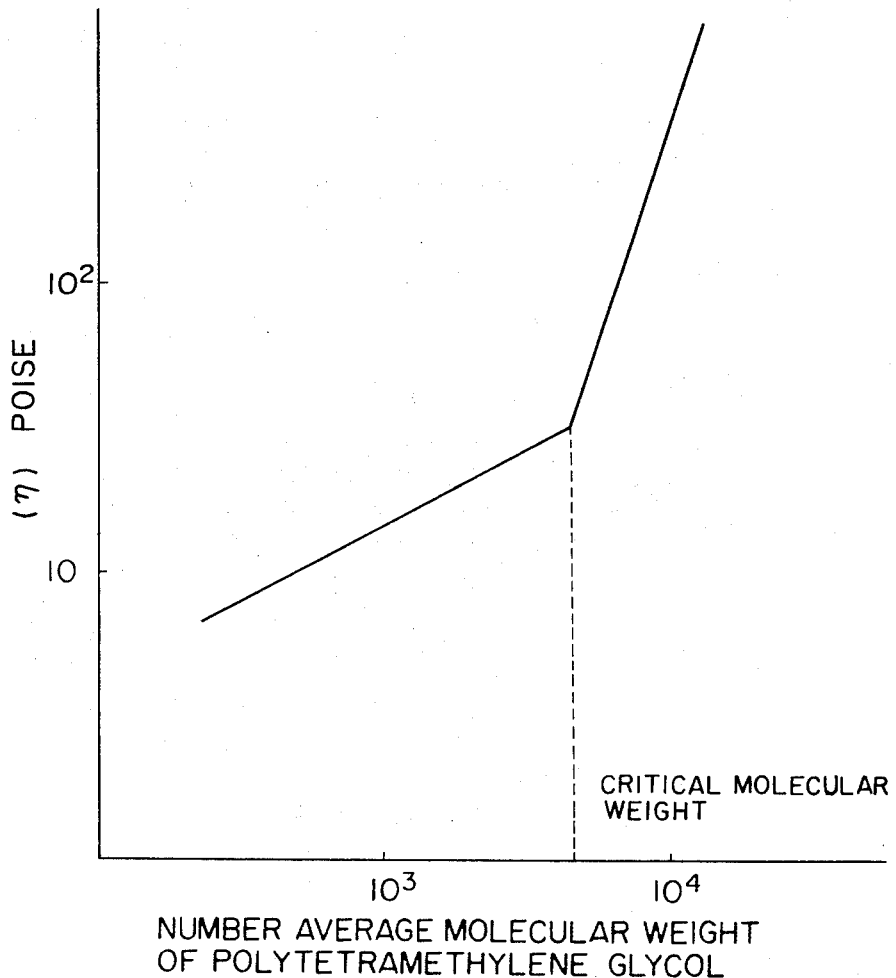
FIG. 1 is a grapth showing relationship between viscosity and number average molecular weight of polytetramethylene glycol.

FIG. 1 shows the relationship between viscosity and number average molecular weight of polytetramethylene glycol and from the refraction point the critical molecular weight of polytetramethylene glycol is determined as 4,500. The abscissa and ordinate are of logarithmic scale.

The viscosity of polyether is measured by the means of an Instron Capillary Rheometer at a constant shear rate and at a constant temperature.

The weight average molecular weight of the polyether is calculated by the count number of molecular weight distribution curve which is measured by gel permeation chromatographic (GPC) method.

Figure 2:
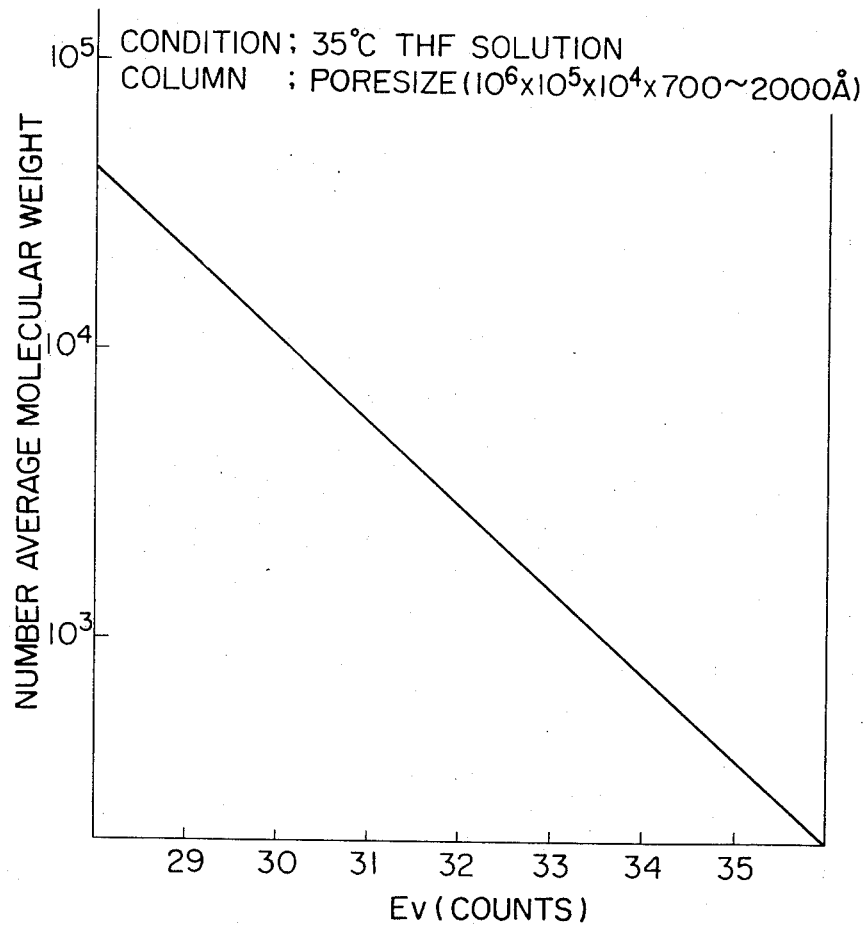
FIG. 2 shows relationship between GPC count number and number average molecular weight.

FIG. 2 shows the relationship between GPC count number and the number average molecular weight and the relationship is independently measured by the vapor pressure osmometric method and the membrane osmometric method.

The critical molecular weight of polyether can be determined from the above relationship.

The polyether used in this invention is the polyether having a terminal functional group containing active hydrogen capable of reacting with an isocyanate group. The functional group is selected from the group consisting of hydroxyl group, mercapto group, amino group and carboxyl group.

Moreover, a pre-extended polymer obtained by reaction between a low molecular weight polymer and a diisocyanate or a product obtained by reaction between said prepolymer and a diol compound may be used in this invention.

Polyethers used in this invention are alkylene glycol such as polyethylene glycol, polypropylene glycol, polytetramethylene glycol and the like, polyalkylene triol such as polypropylene triol and the like, polyalkylene dicarboxylic acid, polyalkylene dithiol, polyalkylene diamine and their pre-extended polymer, and preferably polyalkylene glycol, and more preferably polytetramethylene glycol and its pre-extended polymer.

The polyethers in this invention may be easily obtained by mixing at least one polyether wherein the peak of the molecular weight distribution curve is located in the higher molecular weight region than the rheological critical molecular weight (hereinafter called "critical molecular weight") of polyether with at least one polyether which peak of the molecular weight distribution curve is located in the lower molecular weight region than the critical molecular weight of the polyether. In this case, the weight average molecular weight of said mixture ranges essentially from 4,500 to 20,000.

The above mentioned polyethers may be also obtained directly by polymerization method.

In this invention, a mixture of two or more different kinds of polyethers which critical molecular weights are different from each other, for example, the mixture of polypropylene glycol and polytetramethylene glycol may be used. In this case, it is essential that at least one peak is located at the lower molecular weight region than the lowest critical molecular weight of the polyether and at least one peak is located at the higher molecular weight region than the highest critical molecular weight of the polyether, and the weight average molecular weight of the mixture ranges from 4,500 to 20,000.

It is one of essential factors of this invention to use the DHDM type polyether. Otherwise, as shown in the comparative examples described hereinafter, the object of this invention cannot be accomplished by using polyethers which peak of the molecular weight distribution curve is only one, or which all peaks of the molecular weight distribution curve are located in the lower molecular weight region than the critical molecular weight of the polyether. In these cases, cut growth and flex crack resistance of the elastomer are not improved.

The elastomer produced by using the polyether which all peaks are located in the higher molecular weight region than the critical molecular weight of the polyether used has very low tensile strength at break, and therefore an elastomer having excellent cut growth and flex crack resistance and tensile strength at break cannot be obtained by this method.

It is another essential factor of this invention that the weight average molecular weight of the polyether or polyethers ranges from 4,500 to 20,000.

Satisfactory results cannot be obtained by using the polyether or polyethers having weight average molecular weight of lower than 4,500 or higher than 20,000. For example, the elastomer produced by using the polymer having the weight average molecular weight of lower than 4,500 does not show an improved cut growth and flex crack resistance regardless of its molecular weight distribution curve and the elastomer produced by using the polyether having the weight average molecular weight of higher than 20,000 does not show any good tensile strength at break and casting processability before cross-linking.

There are many processes for preparation of the polyether urethane elastomer of this invention.

One-stage reaction method is that said polyether or polyethers react with polyfunctional isocyanate and a curing agent at same time.

Two-stage reaction method is that at first the prepolymer having a terminal isocyanate is produced by the reaction between said polyether or polyethers and the polyfunctional isocyanate groups, and then the crosslinking elastomer is produced by reaction between the above prepolymer and a curing agent.

Polyfunctional isocyanates used in this invention are not particularly limited, but are preferably aromatic and aliphatic diisocyanates and triisocyanates.

Aromatic diisocyanates are, for example, tolylene-2,4-diisocyanate,
tolylene-2,6-diisocyanate,
naphthalene-1,5-diisocyanate,
diphenyl-4,4'-diisocyanate,
diphenylmethane-4,4'-diisocyanate,
dibenzyl-4,4'-diisocyanate,
stilbene-4,4'-diisocyanate,
benzophenone-4,4'-diisocyanate,
diphenylether- or diphenylsulphide-4,4'-diisocyanate and their derivatives substituted with alkyl, alkoxy, halogen or nitro groups, e.g., 3,3'-dimethyldiphenyl-4,4'-diisocyanate or 3,3'-dichlorodiphenylmethane diisocyanate, their mixtures and the like.

Aliphatic diisocyanates are, for example, 1,6-hexamethylene diisocyanate, 1,3- and 1,4-cyclohexyl diisocyanate, methylene bis (4-cyclohexyl-isocyanate), 1,3- and 1,4-xylene diisocyanate, their mixtures and the like.

Triisocyanates are, for example, tolylene-2,4,6-triisocyanate, diphenylether - 2,2',4 - triisocyanate, triphenylmethane-4,4',4''-triisocyanate, dicyclohexylmethane-2,2',4-triisocyanate and polymethylene polyphenyl isocyanate having the following formula

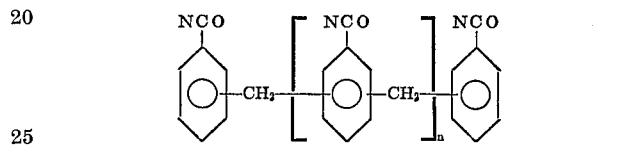

wherein $n$ is 1–8.

Among them, there may be preferably used tolylene-2,4-diisocyanate,
tolylene-2,6-diisocyanate,
naphthalene-1,5-diisocyanate,
diphenyl-4,4'-diisocyanate,
diphenylmethane-4,4'-diisocyanate,
1,6-hexamethylene diisocyanate,
1,3- and 1,4-cyclohexyl diisocyanate,
methylene bis (4-cyclohexyl diisocyanate),
1,3- and 1,4-xylene diisocyanate and their mixtures.

The curing agents in this invention may be aromatic or aliphatic polyamines or polyols.

Aromatic diamines are, for example, methylene bis ortho - chloroaniline, 2,2',5 - trichloro-4,4'-methylenediamines, naphthalene-1,5-diamine, ortho, meta, para-phenylenediamine, tolylene-2,4-diamine, dichlorobenzidine, diphenylether-4,4'-diamine, their derivatives and their mixtures.

Aliphatic polyamines are, for example, hydrazine, ethylenediamine, trimethylenediamine, diethylenetriamine, hexamethylene-1,6-diamine, piperazine, and their mixtures. Polyols are, for example, ethylene glycol, 1,3-propylene glycol, 1,3- and 1,4-butanediol, trimethylolpropane, castor oil and their mixtures.

Among them, there are preferably employed methylene bis ortho-chloroaniline, naphthalene-1,5-diamine, ortho, meta, para-phenylenediamine, tolylene-2,4-diamine, dichlorobenzidine, diphenylether 4,4'-diamine, hydrazine, ethylenediamine, hexamethylene-1,6-diamine, piperazine, ethylent glycol, 1,3-propylene glycol, 1,3 and 1,4-butanediol, trimethylolpropane and their mixtures.

The molar ratio of active hydrogen to isocyanate group is selected from the range of 0.7–1.2. In this invention, satisfactory results are obtained by using a curing agent of the molar ratio of the range of 0.7–1.0, and use of excess of curing agent is unnecessary.

The following examples are provided for illustration of this invention, and are not intended as limitations thereof.

In the following examples, the cut growth and flex crack resistance test was made by means of De Mattia fatigue tester. The means of De Mattia fatigue tester is that 50% constant elongation strain is applied repeatedly to the test specimen ($50^{mm.} \times 25^{mm.} \times 1^{mm.}$) having a 2 mm. width cut at its center at the rate of 300 cycles per minute until the specimen is broken and the number of cycles is counted.

The test of tensile strength at break was made by means of Instron Universal Tester, in which the tension speed was 50 mm./min. and the specimen used was DIN3.

EXAMPLES 1–2 AND COMPARATIVE EXAMPLES 1–3

The relationship between the viscosity and the number average molecular weight was measured in order to determine the critical molecular weight of polytetramethylene glycol, and the result is shown in FIG. 1.

The critical molecular weight of polytetramethylene glycol corresponding to the refraction point shown in FIG. 1 was about 4,500.

Polytetramethylene glycol having number average molecular weight of 9,500 and polytetramethylene glycol having number average molecular weight of 1,900 were mixed at various weight ratios as shown in Table 1 and the molecular weight distribution curve of each mixture was measured by GPC method. It was confirmed that the mixtures were all DHDM type polyether.

One mole equivalent of said mixture was reacted with 2 moles of 2,4-tolylene diisocyanate at 80° C. for 8 hours to obtain the prepolymer having the isocyanate terminal groups. For comparative examples, the same procedures were applied for polytetramethylene glycol having the number average molecular weight of 9,500 or 1,900 respectively.

Methylene bis ortho-chloroaniline was added to said prepolymer at molar ratio (—NH$_2$/NCO) of 0.9 to prepare a composition. Said composition was cast into a slab mould and was cured at 100° C. for 4 hours.

A cut growth and flex crack test was made on the test specimen and the test results are shown in Table 1 together with results of a tensile strength at break and a casting processability.

From the above results, it was observed that the improvement in a cut growth and flex crack resistance accompanied with high level of tensile strength at break and good casting processability was shown on the urethane elastomer of Examples 1 and 2.

In comparative Examples 1 and 3, it was observed that the elastomers prepared by using the polyether wherein the peak of the molecular weight distribution curve was only one were poor in cut growth and flex crack resistance.

Comparative Example 2 shows the result of the elastomer obtained by using the polytetramethylene glycol having two peaks in the molecular weight distribution curve and having the lower weight average molecular weight than 4,500. The result shows that the elastomer of Comparative Example 2 have good casting processability but does not have good cut growth and flex crack resistance.

TABLE 1

| Example number: | Number average molecular weight of polyether I | Number average molecular weight of polyether II | Mixing ratio I/II (wt./wt.) | Weight average molecular weight after mixing | Cut growth and flex crack resistance (cycles) | Casting processability | Tensile strength at break (kg./cm.²) |
|---|---|---|---|---|---|---|---|
| 1 | 9,500 | 1,900 | 75/25 | 8,000 | (¹) | Easy | 180 |
| 2 | 9,500 | 1,900 | 50/50 | 6,020 | 4,200 | do | 322 |
| Comparative Example: | | | | | | | |
| 1 | 9,500 | | | 9,990 | 2,000 | Difficult | 80 |
| 2 | 9,500 | 1,900 | 25/75 | 4,030 | 1,000 | Easy | 390 |
| 3 | | 1,900 | | 2,040 | 350 | do | 472 |

¹ No defect after 200,000 cycles.

EXAMPLES 3–5 AND COMPARATIVE EXAMPLES 4–5

Following the procedure of Example 1 except that polytetramethylene glycol having number average molecular weight of 11,500 and polytetramethylene glycol having number average molecular weight of 1,900 were mixed at various weight ratio in place of those in Example 1, then were obtained mixtures as shown in Table 2.

Figure 3:
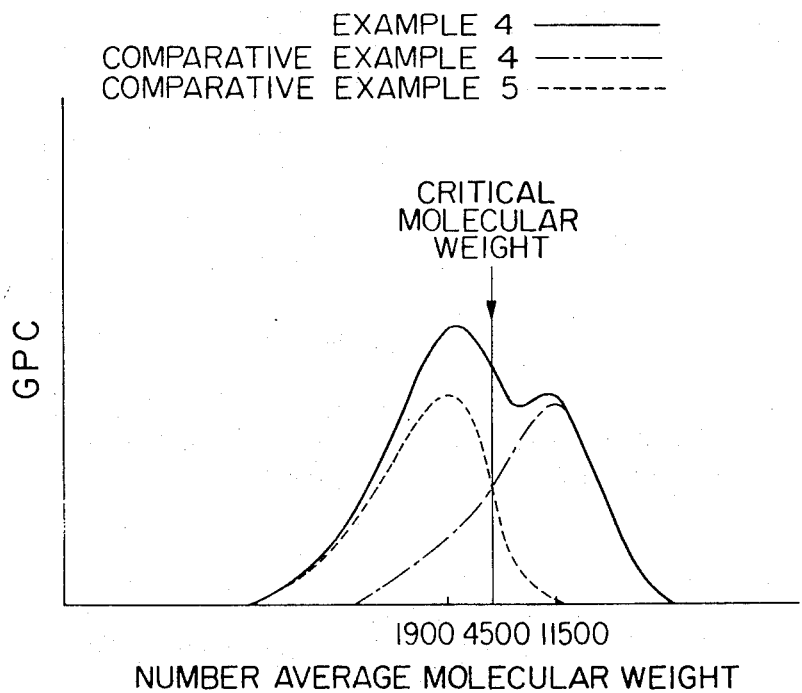
FIG. 3 shows molecular weight distribution curve of Example 4 and Comparative Examples 4 and 5.

The molecular weight distribution curve of Example 4, Comparative Examples 4 and 5 measured by GPC method were shown in FIG. 3.

The test specimens were prepared by reacting the mixture of polytetramethylene glycols having number average molecular weight of 11,500 and 1,900 or each of polytetramethylene glycol having number average molecular weight of 11,500 or 1,900 with 2,4-tolylene diisocyanate and methylene bis ortho-chloroaniline to cast for slab mould.

The test results were shown in Table 2.

TABLE 2

| Example number | Number average molecular weight of polyether I | Number average molecular weight of polyether II | Mixing ratio I/II (wt./wt.) | Weight average molecular weight after mixing | Cut growth and flex crack resistance (cycles) | Casting processability | Tensile strength at break (kg./cm.²) |
|---|---|---|---|---|---|---|---|
| Comparative Example 4 | 11,500 | | | 12,400 | 2,500 | Extremely difficult | 60 |
| Example: | | | | | | | |
| 3 | 11,500 | 1,900 | 75/25 | 9,810 | (¹) | Somewhat difficult | 170 |
| 4 | 11,500 | 1,900 | 50/50 | 7,220 | (¹) | Easy | 250 |
| 5 | 11,500 | 1,900 | 25/75 | 4,630 | 4,000 | do | 380 |
| Comparative Example 5 | | 1,900 | | 2,040 | 350 | do | 475 |

¹ No defect after 2000,000 cycles.

EXAMPLES 6–7 AND COMPARATIVE EXAMPLES 6–8

Following the procedure of Example 1 except that polytetramethylene glycol having a number average molecular weight of 9,500 and polytetramethylene glycol having a number average molecular weight of 850 were mixed at various weight ratios in place of those in Example 1, there were obtained mixtures as shown in Table 3.

Test specimens were prepared and tested, and the results are listed in Table 3 below.

TABLE 3

| Example number | Number average molecular weight of polyether I | Number average molecular weight of polyether II | Mixing ratio I/II (wt./wt.) | Weight average molecular weight after mixing | Cut growth and flex crack resistance (cycles) | Casting processability | Tensile strength at break (kg./cm.²) |
|---|---|---|---|---|---|---|---|
| Comparative Example 6 | 9,500 | | | 9,990 | 2,000 | Difficult | 80 |
| Example: | | | | | | | |
| 6 | 9,500 | 850 | 75/25 | 7,730 | 25,000 | Easy | 210 |
| 7 | 9,500 | 850 | 50/50 | 5,460 | 4,200 | do | 350 |
| Comparative Example: | | | | | | | |
| 7 | 9,500 | 850 | 25/75 | 3,200 | 300 | do | 457 |
| 8 | | 850 | | 930 | 10 | do | 580 |

COMPARATIVE EXAMPLES 9–10

In Comparative Example 9, polytetramethylene glycol having the number average molecular weight of 1,900 and polytetramethylene glycol having the number average molecular weight of 850 were mixed at a mixing ratio of 50/50 as shown in Table 4.

In Comparative Example 10, polytetramethylene glycol having the number average molecular weight of 11,500 and polytetramethylene glycol having the number average molecular weight of 7,200 were mixed at a mixing ratio of 25/75 as shown in Table 4.

Mixing and testing of said mixtures were made by the same procedure as that of Example 1.

The test results were shown in Table 4.

TABLE 4

| Example Number | Number average molecular weight of polyether I | Number average molecular weight of polyether II | Mixing ratio I/II (wt./wt.) | Weight average molecular weight after mixing | Cut growth and flex crack resistance (cycles) | Casting processability | Tensile strength at break (kg./cm.₂) |
|---|---|---|---|---|---|---|---|
| Comparative Example: | | | | | | | |
| 9 | 1,900 | 850 | 50/50 | 1,490 | 200 | Easy | 525 |
| 10 | 11,500 | 7,200 | 25/75 | 8,480 | 1,500 | Somewhat difficult | 60 |

In Comparative Example 9, two peaks of the molecular weight distribution curve of polytetramethylene glycol were both located in the lower molecular weight region than the critical molecular weight and the weight average molecular weight of the mixture was lower than 4,500.

In comparative Example 10, two peaks of the molecular weight distribution curve were both located in the higher molecular weight region than the critical molecular weight.

In both cases such as described above, the cut growth and flex crack resistance and tensile strength at break of the elastomer were all not improved.

EXAMPLE 8

Hexamethylene diisocyanate was added to the polytetramethylene glycol having the number average molecular weight of 1,900 at the molar ratio (—NCO/—OH) of 0.88 and was heated at 80° C., for 16 hours to obtain the pre-extended polyol having the molecular weight of 11,500.

Then, 2.0 mole equivalent of tolylene diisocyanate was added to 1.0 mole equivalent of said pre-extended polyol to obtain the prepolymer having the terminal isocyanate groups.

On the other hand, 2.0 mole equivalent of tolylene diisocyanate was added to 1.0 mole equivalent of polymethylene glycol having the number average molecular weight of 1,900 to obtain the prepolymer having the terminal isocyanate groups.

Both prepolymers were mixed at the mixing ratio of 50/50 to obtain the mixture having the weight average molecular weight of 7,700. The test specimens were prepared end was tested by the same procedure as that of Example 1. The test result was that no defect was observed after elongation straining of 200,000 cycles. The tensile strength at break was 280 kg./cm.².

EXAMPLE 9

Following the procedure of Example 8 except that the mixture of prepolymer having an isocyanate terminal group was prepared and 1,4-butanediol was added to said mixture of prepolymer at the molar ratio (—NCO/—OH) of 1.0/0.9, the test specimens were prepared by curing said mixture of 100° C., for 24 hours. The test result of cut growth and flex crack resistance was that no defect was observed after elongation straining of 200,000 cycles. The tensile strength at breaks of it was 140 kg./cm.².

EXAMPLE 10

According to Example 8, the pre-extended polyol having the number average molecular weight of 11,500 was prepared.

Forty parts of said pre-extended polyol and 60 parts of polytetramethylene glycol having the number average molecular weight of 1,900 were mixed to prepare the mixture having the weight average molecular weight of 8,800.

Then 2.0 mole equivalent of 4,4'-diphenylmethane diisocyanate was added to said mixture and was reacted at 60° C. for 8 hours to obtain the prepolymer having isocyanate terminal groups.

Methylene bis ortho-chloroaniline was added to said mixture of prepolymer at the mole ratio (—NCO/—OH) of 0.9. The test specimens were prepared by curing said mixture at 100° C. for 3 hours. The test of cut growth and flex crack was made as in Example 8. The test results was that the specimen was broken after elongation straining of about 10,000 cycles. The tensile strength at break was 345 kg./cm.².

EXAMPLE 11

The critical molecular weight of polypropylene glycol was about 3,500 by the same measuring procedure as that of Example 1.

Fifty parts of polypropylene glycol having the number average molecular weight of 9,340 and 50 parts of polypropylene glycol having the number average molecular weight of 930 were mixed to prepare the mixture having the weight average molecular weight of 5,500.

Tolylene diisocyanate was added to said mixture at the mole ratio (—NCO/—OH) of 2.0 and was reacted at 80° C. for 4 hours to obtain the prepolymer having the isocyanate terminal groups. The test result of cut growth and flex crack resistance was that the specimen was broken after elongation straining of 4,100 cycles. The tensile strength at break was 250 kg./cm.²

EXAMPLE 12

Fifty parts of polypropylene glycol having the number average molecular weight of 9,340 and 50 parts of polytetramethylene glycol having the number average molecular weight of 1,900 were mixed to prepare the mixture having the weight average molecular weight of 5,900.

4,4'-diphenylmethane diisocyanate was added to said mixture at the molar ratio (—NCO/—OH) of 2.0 and was reacted at 80° C. for 8 hours to prepare the prepolymer having the isocyanate terminal groups.

Methylene bis ortho-chloroaniline was added to said prepolymer at the molar ratio (—NH₂/—NCO) of 0.9 and was cast into a test specimen and was cured at 100° C. for 4 hours. The test result was that the specimen was broken after elongation straining of 4,800 cycles. The tensile strength at break was 350 kg./cm.².

What is claimed is:

1. Polyether urethane elastomer having improved cut growth and flex crack resistance prepared by using polyfunctional isocyanate, curing agent and polyether having active hydrogen terminal groups, wherein the weight average molecular weight of said polyether is within the range of 4,500 to 20,000 and the molecular weight distribution curve of said polyether has at least two peaks, at least one of which is located in the region above the critical molecular weight and at least another one of which is located in the region below the critical molecular weight of said polyether, and wherein the polyether has an active hydrogen terminal group which is a hydroxyl group and can react with the isocyanate group.

2. Polyether urethane elastomer as claimed in claim 1, wherein said polyether is prepared by mixing at least one polyether which a peak in the molecular weight distribution curve is located at the lower molecular weight region than the critical molecular weight of said polyether with at least another one polyether which peak in the molecular weight distribution curve is located at the higher molecular weight region than the critical molecular weight of said polyether.

3. Polyether urethane elastomer as claimed in claim 1, wherein said polyether is at least one selected from the group consisting of polyalkylene glycol, polyalkylene triol, their mixture and their pre-extended polymer.

4. Polyether urethane elastomer as claimed in claim 1, wherein said polyether is polyalkylene glycol.

5. Polyether urethane elastomer as claimed in claim 3, wherein said pre-extended polymer is prepared by reacting polyalkylene glycol with diisocyanate.

6. Polyether urethane elastomer as claimed in claim 4, wherein said polyalkylene glycol is selected from the group consisting of polyethylene glycol, polypropylene glycol, polytetramethylene glycol and their mixtures.

7. Polyether urethane elastomer as claimed in claim 4, wherein said polyalkylene glycol is polytetramethylene glycol.

8. Polyether urethane elastomers as claimed in claim 1, wherein said polyfunctional isocyanate is at least one selected from the group consisting of aromatic diisocyanate, aliphatic diisocyanate and triisocyanate.

9. Polyether urethane elastomers as claimed in claim 1, where in said polyfunctional isocyanate is at least one selected from the group consisting of tolylene-2,4-diisocyanate, tolylene-2,6-diisocyanate, naphthalene-1,5-diisocyanate, diphenyl-4,4'-diisocyanate, diphenylmethane-4,4'-diisocyanate, 1,6-hexamethylene diisocyanate, 1,3-, and 1,4-cyclohexyl diisocyanate, methylene-bis(4-cyclohexyl diisocyanate) 1,3- and 1,4-xylylene diisocyanate and their mixtures.

10. Polyether urethane elastomers as claimed in claim 1, wherein said curing agent is at least one selected from the group consisting of polyamine, polyol and their derivatives.

11. Polyether urethane elastomers as claimed in claim 1, wherein said curing agent is at least one selected from the group consisting of methylene-bis-ortho-chloro-aniline, naphthalene-1,5-diamine, ortho-, meta- and para-phenylenediamine, tolylene-2,4-diamine, dichlorobenzidine, diphenylether 4,4'-diamine, hydrazine, ethylenediamine, hexamethylene-1,6-diamine, piperazine, ethylene glycol, 1,3-propylene glycol, 1,3- and 1,4-butanediol, trimethylol propane and their mixtures.

12. A process for the preparation of a polyether urethane elastomer as claimed in claim 1, which comprises mixing at least one polyether having a molecular weight distribution curve peak in the region below the critical molecular weight of said polyether and at least one other polyether having a molecular weight distribution curve peak in the region above the critical molecular weight of the other polyether, reacting the polyether and polyfunctional isocyanate, and then cross-linking the product with a curing agent.

13. A process for the preparation of a polyether urethane elastomer as set forth in claim 1, which comprises preparing the polyether by mixing at least one polyether having a molecular weight distribution curve peak in the region below the critical molecular weight of the polyether with at least one other polyether having a molecular weight distribution curve peak in the region above the critical molecular weight of the other polyether, and reacting the polyether mixture, polyfunctional isocyanate and curing agent together simultaneously.

References Cited
UNITED STATES PATENTS
2,929,800   3/1960   Hill _____ 260—77.5 AM M. J. WELSH, Primary Examiner U.S. Cl. X.R.
260—77.5 AP